United States Patent
Dyl

(10) Patent No.: US 7,702,723 B2
(45) Date of Patent: Apr. 20, 2010

(54) EFFICIENT METHOD FOR PROVIDING GAME CONTENT TO A CLIENT

(75) Inventor: Christopher J. Dyl, Rehoboth, MA (US)

(73) Assignee: Turbine, Inc., Westwood, MA (US)

( * ) Notice: Subject to any disclaimer, the term of this patent is extended or adjusted under 35 U.S.C. 154(b) by 1705 days.

(21) Appl. No.: 10/632,410

(22) Filed: Aug. 1, 2003

(65) Prior Publication Data

US 2005/0026692 A1 Feb. 3, 2005

(51) Int. Cl.
*G06F 15/16* (2006.01)
(52) U.S. Cl. .................. 709/203; 709/200; 463/42
(58) Field of Classification Search ............... 709/203, 709/220, 242, 200; 463/42
See application file for complete search history.

(56) References Cited

U.S. PATENT DOCUMENTS

| | | | | |
|---|---|---|---|---|
| 5,964,660 A | * | 10/1999 | James et al. | 463/1 |
| 6,106,399 A | * | 8/2000 | Baker et al. | 463/42 |
| 6,482,087 B1 | | 11/2002 | Egozy et al. | 463/7 |
| 7,185,352 B2 | * | 2/2007 | Hallford et al. | 725/28 |
| 2002/0061743 A1 | | 5/2002 | Hutcheson et al. | 455/426 |
| 2002/0120939 A1 | * | 8/2002 | Wall et al. | 725/87 |
| 2003/0008712 A1 | * | 1/2003 | Poulin | 463/42 |
| 2003/0028870 A1 | * | 2/2003 | Weisman et al. | 717/178 |
| 2003/0037149 A1 | | 2/2003 | Hess | 709/227 |
| 2003/0087221 A1 | | 5/2003 | Sagar | 434/319 |
| 2005/0074100 A1 | * | 4/2005 | Lederman | 379/102.01 |
| 2005/0114794 A1 | * | 5/2005 | Grimes et al. | 715/840 |

OTHER PUBLICATIONS

Editorial Preview by The Adrenaline Vault, "Spec Ops 2: Green Berets," http://www.avault.com/previews/preview_temp.asp?game=specops2&page=2 (3 pgs.) 2003.
Walsh, Ciaran, "Prisoner of War," http://www.music4games.net/f_powiv.html (3 pgs.).
Lynne, Bjorn, "Games That Use DirectMusic," http://www.freelists.org/archives/directmusic/07-2002/msg00008.html (2 pgs.) 2002.
Microsoft Corporation, "DirectMusic Producer Version 7.0: New Features for Creating Interactive Audio Content" http://msdn.microsoft.com/library/default.asp?url=library/en-us/dnmusic/html/dmp_7.asp (7 pgs.) 2000.

* cited by examiner

*Primary Examiner*—Salad Abdullahi
*Assistant Examiner*—El Hadji M Sall
(74) *Attorney, Agent, or Firm*—Occhiuti Rohlicek & Tsao LLP

(57) ABSTRACT

Methods and systems are provided for efficiently providing content to a client in a massively multiplayer game.

13 Claims, 5 Drawing Sheets

EFFICIENT METHOD FOR PROVIDING GAME CONTENT TO A CLIENT

FIELD OF INVENTION

This invention relates generally to multiplayer computer games, and in particular, to methods for efficiently providing content to a client in a massively multiplayer game.

BACKGROUND

A massively multiplayer game ("MMP") is a computer game played by a large number of users through a communications network, which can be a local area network (e.g., Ethernet), a medium-area network (e.g., an intranet), or a wide-area network (e.g., the Internet). In addition, the communications network can be a wireless network, a cellular network or any other system which facilitates the transmission of data. In MMPs, humans and their avatars within the game ("players") are free to interact with other players as well as autonomous "non-player characters" which inhabit and are part of the game. Early examples of MMPs include games such as Ultima Online, EverQuest, and CrossGate.

Most MMPs are fantasy role-playing games ("RPGs") which take place within a mythical or mystical world. Most MMPs appear timeless, in that from the player's perspective they have no beginning and no end. New players can join a game in progress at any time, and do not need to wait for the start of a new game. In addition, many MMPs do not even define an absolute game endpoint, making the end of a game a logical impossibility. Thus, once a game has started, it can continue indefinitely. The players of that MMP are thereby involved in a continuing storyline akin to life within the real world. MMPs allow players to develop their avatars, form personal relationships with other players, and to enjoy social interaction through the reality of the game.

In order to make MMPs more immersive for their players, MMP creators constantly strive to provide a richer and more complete sensory interaction. To that end, MMP creators have developed graphics and multimedia content that takes advantage of ever-improving consumer graphics and multimedia hardware. However, because many graphics and multimedia files are often very large relative to other informational content such as text, transmitting these files from a server to a client may require significant bandwidth and time. Clients who do not have sufficient hardware, bandwidth or time may not wish to receive such large files unnecessarily.

Accordingly, new methods are needed to improve the efficiency with which players receive content.

SUMMARY OF THE INVENTION

In satisfaction of this need, embodiments of the present invention provide methods and systems for separating high-quality content in MMPs.

In accordance with one aspect of the invention, a method is provided for efficiently transmitting a content update to a client in an online game. This method comprises hosting data files, identifying high-quality data files, creating a high-quality content update, receiving a client connection request, determining that high-quality data files are to be transmitted to the client, transmitting data files from the high-quality content update, and transmitting the remaining data files comprised in the content update.

In some embodiments, the data files are stored on a network storage device.

In some embodiments, a data quality function is used to identify high-quality data files. In one version, data files contained in the content update are sorted by data quality and a certain fixed percentage of the highest quality data components are separated as high-quality data files. In another version, the data quality function is based on the sizes of the plurality of data files.

In some embodiments, high-quality data files are removed from the content update.

In some embodiments, determining that high-quality data files are to be sent to the client comprises determining that the received request includes a bit value indicating high-quality files should be transferred.

In accordance with another aspect of the invention, a method is provided for efficiently transmitting a content update from a server to a client. This method comprises the server hosting a content update comprising a plurality of data files, identifying a subset of the plurality of data files comprising the content update as high-quality data files, creating a high-quality content update comprising the identified high-quality data files, the client requesting a connection with the server, determining that high-quality data files should be transmitted to the client, the client receiving data files from the high-quality content update to the client, and the client receiving the remaining data files comprised in the content update to the client.

In some embodiments, the content update is stored on a network storage device.

In some embodiments, a data quality function is used to identify high-quality data files. In one version, data files contained in the content update are sorted by data quality and a certain fixed percentage of the highest quality data components are separated as high-quality data files. In another version, the data quality function is based on the sizes of the plurality of data files.

In some embodiments, high-quality data files are removed from the content update.

In some embodiments, determining that high-quality data files are to be sent to the client comprises determining that the received request includes a bit value indicating high-quality files should be transferred.

In accordance with another aspect of the invention, an apparatus is provided for updating content. Specifically, this apparatus comprises a non-volatile memory element storing a content update comprising a plurality of data files, a processor in electrical communication with the non-volatile memory element identifying a subset of the data files in the content update as high-quality data files, separating the high-quality data files from the content update, and storing in the non-volatile memory element a high-quality content update comprising the separated high-quality data files, and a transceiver in electrical communication with the non-volatile memory element and the processor, the transceiver receiving a connection request from a remote client on a network, wherein the processor determines that high-quality data files are to be transmitted to the client and the transceiver transmits data files from the high-quality content update and the remaining data files comprising the content update.

In some embodiments, the processor identifies a subset of the plurality of data files as high-quality data files using a data quality function.

In some embodiments, the processor removes the high-quality data files from the content update.

In some embodiments, the connection request from a remote client received by the transceiver includes a bit value indicating high-quality files should be transferred.

In some embodiments, the non-volatile memory element comprises a network storage device.

In some embodiments, the non-volatile memory element is associated with a first computer, the processor is associated with a second computer, the transceiver is associated with a third computer, and the first computer, second computer, and third computer are in electrical connection with each other over a network.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION

The methods and systems to efficiently provide content to a client in a MMP will now be described with respect to preferred embodiments; however, the methods and systems of the present invention are not limited to massively multi-player games. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention.

While the content and nature of MMPs is the key to their widespread success, it is important to understand the technological underpinnings of a typical MMP. Although it is possible to host and play a computer game, and even an MMP, on a single computer, it is not preferred for MMPs. Accordingly, the following description of an exemplary system architecture is provided.

Figure 1:
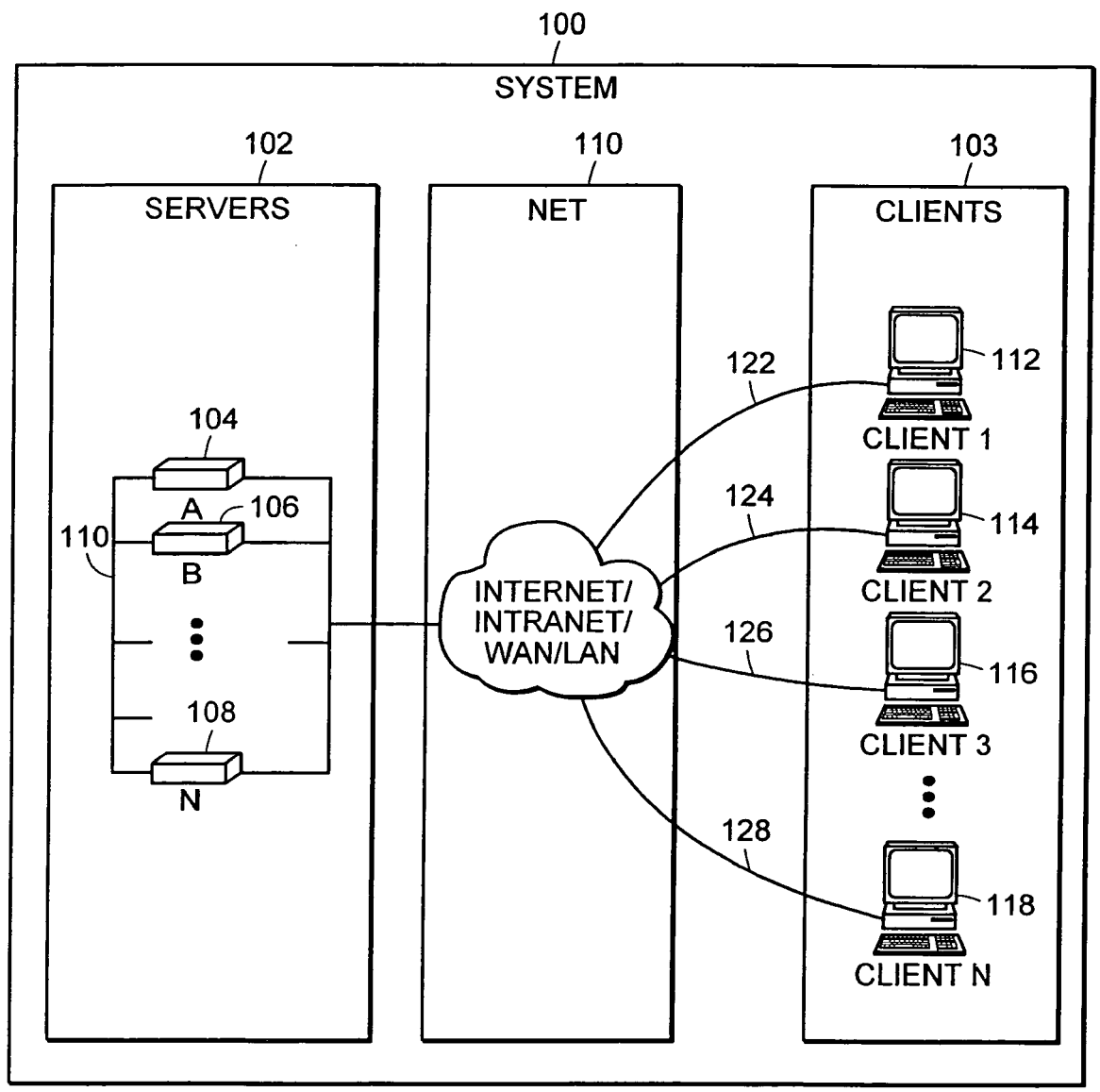
FIG. 1 illustrates a distributed computer system in accordance with one embodiment of the present invention.

FIG. 1 illustrates a distributed computer system 100 in accordance with one embodiment of the present invention.

The system 100 includes a server platform 102 and a client or player platform 103. The server platform 102 can include a plurality of individual servers 104, 106, 108. The client platform 103 can include a plurality of individual clients 112, 114, 116, 118. The number of clients is virtually limitless, constrained only by the physical characteristics of the server platform 102, client platform 103 and a communications network 110 connecting the two. As will be appreciated, the system 100 is a distributed virtual environment tailored to facilitate MMPs.

Each of the clients 112, 114, 116, 118 comprises a personal computer running client software which facilitates a player's operation of and interaction with the game. However, in other embodiments the clients 112, 114, 116, 118 may also comprise other devices, including but not limited to, cellular telephones (such as the Motorola Inc. A388c), wireless or palm-top computers (such as the Series 7 by Psion PLC), portable digital assistants (such as the Tungsten C by Palm Inc.), handheld game systems (such as the Gameboy Advance by Nintendo of America Inc.), game consoles (such as the Play Station 2 by Sony Corporation of America), etc.

Each client 112, 114, 116, 118 is generally responsible for displaying interacting objects (other players, terrain, non-player characters, etc.), displaying the game's interface, processing a player's inputs, playing music and sound and performing other CPU or bandwidth intensive operations.

Each of the servers 104, 106, 108 generally includes a computer system having a server platform portion of the game for communication, database storage, coordination, and overall control and administration of the game. The servers 104, 106, 108 generally maintain state information and coordinate client interaction with various objects in a virtual environment, including but not limited to other clients, vehicles, artificial intelligence, terrain, music and sound. Each server 104, 106, 108 provides additional functions, such as security, recording game goals and scoring and tracking each player's advancement towards those goals.

The clients 112, 114, 116, 118 communicate with the server platform 102 via the communication network 110. In the preferred embodiment, the communication network 110 depicted comprises the internet, but in other embodiments the communication network 110 could be an intranet, WAN or LAN, or any other type of network utilized for communicating between the server platform 102 and the client platform 103. For example, the communications network 110 could include, without limitation, a wireless network, a cellular network or any other system which facilitates the transmission of data. Each client 112, 114, 116, 118 has an associated communications link (or session) with one or more of the servers 104, 106, 108. As shown in FIG. 1, client 1 112 could communicate with server A 104 via a communications link 122. Similarly, client 2 114 could communicate with server B 106 via communications link 124. The servers 104, 106, 108 are interconnected via a communications network 110. In the embodiment shown in FIG. 1, the communications network 110 is depicted as a dedicated network, but could also be a shared network such as the Internet.

During operation of the system 100, a particular client, for example client 1 112, which desires to enter the game communicates through a communications link 122 with an allocated server A 104. The determination of which specific server 104, 106, 108 a particular client is linked with will depend on a number of parameters, such as server load, number of clients, location of clients, status of client (e.g., position) within the game itself, and other parameters as are known to those skilled in the art. In the particular embodiment shown in FIG. 1, the number of servers 104, 106, 108 needed for allocation depends upon the number of clients. FIG. 1 illustrates operation of the system 100 when a large number of clients 112, 114, 116, 118 are logged onto a plurality of servers 104, 106, 108.

When there are relatively few clients 103 participating in the game, only one server is typically needed to serve the clients 103. During game operation, there is often no need for direct communication between clients. The server platform 102 communicates with each client its positional, status and event data (referred to as client or player data, or as a player's attributes) for every other player and object the client can see or interact with inside the virtual environment of the game. Such player data includes, but is not limited to, avatar attributes, type, physics modeling, scoring, position, orientation, motion vector, animation, background music, player music, inventory, vehicle, call sign, or other client or object attributes necessary for the particular game. Typically, the server includes a database of information that is maintained and updated as the players interact within the game. Through the interaction between the client platform 103 and the server platform 102, the game is facilitated.

Figure 2:
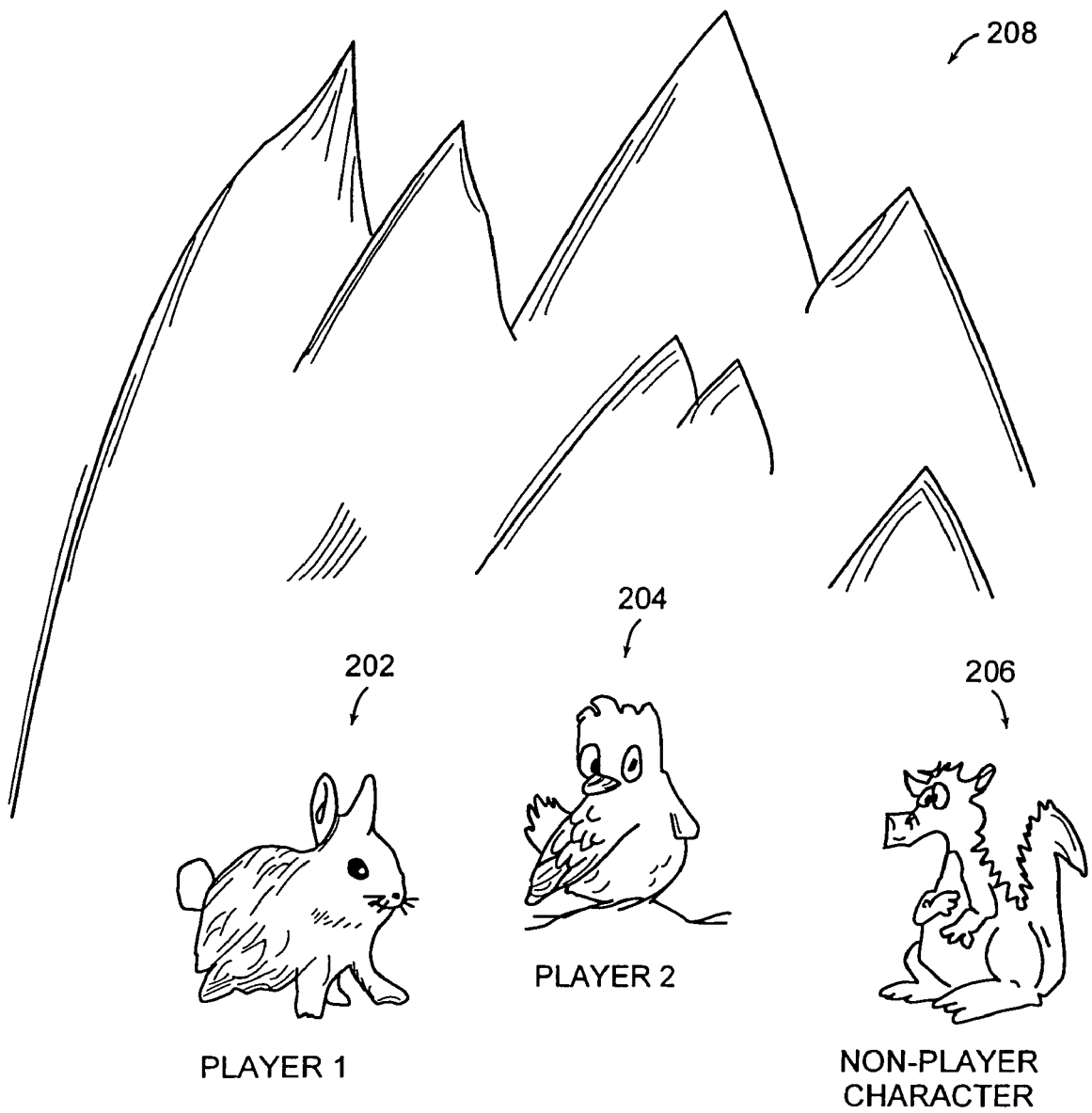
FIG. 2 depicts a typical scene within the virtual environment of the game.

FIG. 2 depicts typical content that is represented within the virtual environment of one embodiment of an MMP. As illustrated in FIG. 2, a number of objects are present within the scene. In the embodiment shown in FIG. 2, a small rabbit 202 (the "bunny"), a young bird 204 (the "chick") and a dragon 206 are present. The bunny 202, the chick 204 and the dragon 206 are located with a mountain range context 208. The client must process the content describing the bunny 202, the chick 204, the dragon 206, the mountain range 208, along with information about how they are to be displayed on the player's screen. The client may also need to display additional content, such as, for example, audio files, graphics files, and multi-media files.

In order to be processed and displayed by the client, content must somehow be placed at the client. Some content may be placed at the client without any server interaction in an off-line process, such as when a player loads a game program and associated content onto the client from a CD-ROM. Other content may be placed at the client in a communication outside of a program execution, such as when a client initializes a connection with a server and the server then transmits content. Still other content may be placed at the client via a communication with a server that takes place during a program execution, such as when the client has already established a connection with a server and is executing a program that requires additional content to be fetched from the server.

In accordance with a preferred embodiment of the invention, content may be designated as "high-quality". High-quality content may comprise, for example, graphics or audio files which are relatively large. Generally, high-quality content may require more time and bandwidth to transmit, and may require more processing power by the client than content which is not high-quality. For example, a five megabyte graphics file will require more bandwidth and/or time to transmit to a client than a fifty kilobyte file. A five megabyte graphics file may also require superior graphics processing hardware in order to display on the player's computer in a reasonable manner.

In recognition of the variety of hardware and bandwidth requirements that may exists among clients, a preferred embodiment of the invention maintains multiple versions for some content. For large graphics files, for example, a high-quality file and a lower quality file may be maintained. With reference to FIG. 2, the bunny 202 may be represented graphically in both high-quality and lower quality form. The high-quality version is designated as high-quality content. The high-quality version of the bunny 202 may appear on the player's screen at a higher resolution and in greater detail than the lower quality version. For example, finer features of the bunny 202, such as whiskers, may only be visible on the player's screen in the high-quality version.

To facilitate the efficient delivery of content to the client, a content update package is stored on the server, in accordance with a preferred embodiment of the invention. The content update package is a collection of data files that may be sent to the client to effectuate or enhance game play. Typically, the content update package comprises the most recent versions of the data files, along with metadata about the data files, such as version information. The content update package typically contains an iteration number. When a game developer modifies a data file, the modified file is stored in the content update package, whose iteration number is incremented. A client typically notifies the server of the iteration number for the content update package it has most recently obtained. The server then compares the client's iteration number with the iteration number of the current content update package, and transmits to the client any data files added or modified subsequent to the client's current iteration. Alternatively, the client may check to see if it has the most recent version of a data file, and if it does not, it obtains the most recent version of the file from the content update package. Thus, the entire content update package does not need to be sent to the client; only those files that are necessary to keep the client up-to-date are sent.

As previously mentioned, a preferred embodiment of the invention provides for the separation of high-quality content from the content update package. Separating high-quality content offers advantages to clients, which may now spend less time downloading content from the server if the client does not require the high-quality data files. Separating high-quality content also offers advantages to servers, which may now require less bandwidth to transmit files to their respective clients. Separating high-quality content further offers advantages to developers, who may manipulate smaller content update packages when developing content that is not high-quality.

Figure 3:
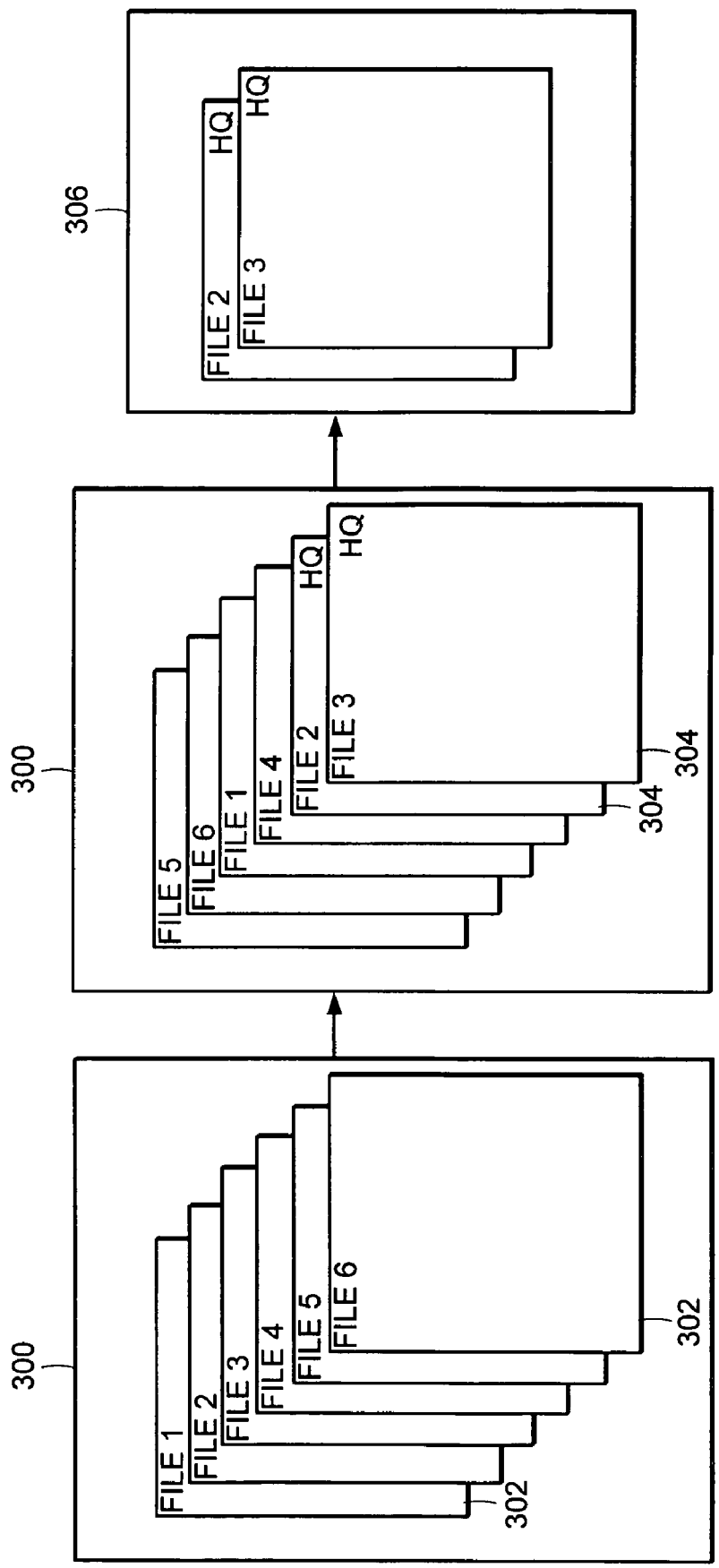
FIG. 3 illustrates the separation of high-quality content in accordance with one embodiment of the invention.

An exemplary separation of high-quality content is illustrated in FIG. 3. In the example, a content update package 300 comprises six individual data files 302. The data files are sorted by a quality metric and two of the individual data files 304 are identified as high-quality data files. These two high-quality data files 304 are placed in a new high-quality content update package 306. The high-quality data files 304 may or may not be removed from the content update package 300.

Figure 4:
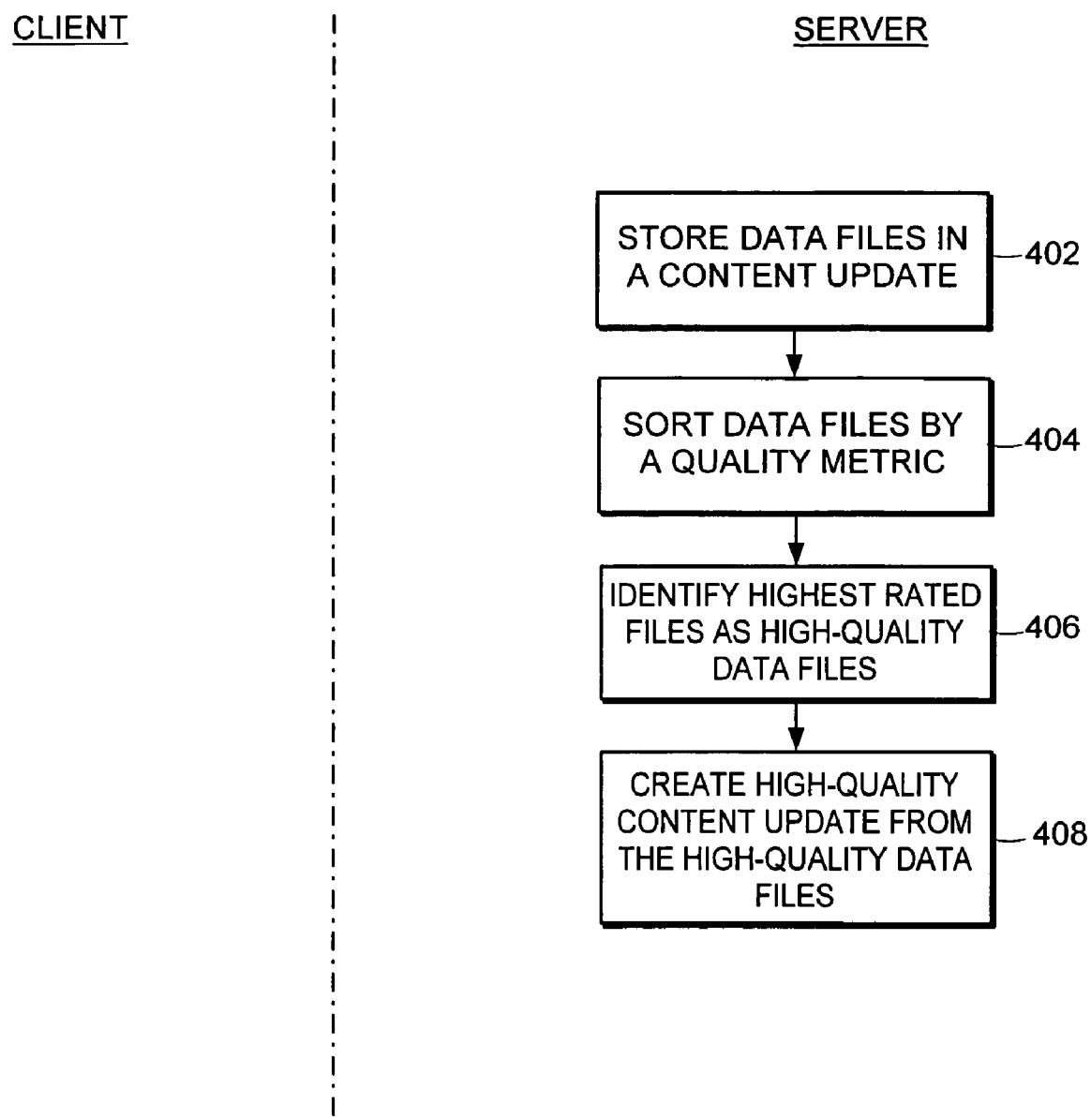
FIG. 4 is a flow chart which illustrates the creation of a high-quality content update package in accordance with one embodiment of the invention.

In greater detail, the separation of high-quality content as implemented in a preferred embodiment of the invention is shown in FIG. 4. Data files are placed in a content update package on the server in a content update package creation step 402. A quality metric is then applied to the data files in the content update package in a quality rating step 404. The data files with the highest quality ratings are identified as high-quality data files in a high-quality identification step 406. The high-quality data files are placed in a high-quality content update package in a high-quality update package creation step 408.

In one embodiment, the quality metric applied in the quality rating step 404 is simply the size of the individual files in the content update package. In another embodiment, the quality metric may be subjectively applied by a game developer. In another embodiment, the quality metric may correspond to the type of the data file. In an alternative embodiment of the invention, the quality rating step 404 need not be applied—data files may be arbitrarily designated as high-quality data files by a game designer.

The high-quality identification step 406 may be accomplished, for example, by first sorting the data files by their quality ratings. In one embodiment, a fixed percentage of the data files (e.g., the top 5 percent rated files) are identified as high-quality. In another embodiment, any data file whose quality rating is above a threshold (e.g., files larger than one megabyte) may be identified as high-quality. In another embodiment, any file of a particular type—such as, for example, a multi-media file—may be identified as high-quality. Other methods for identifying high-quality data files may be used.

Figure 5:
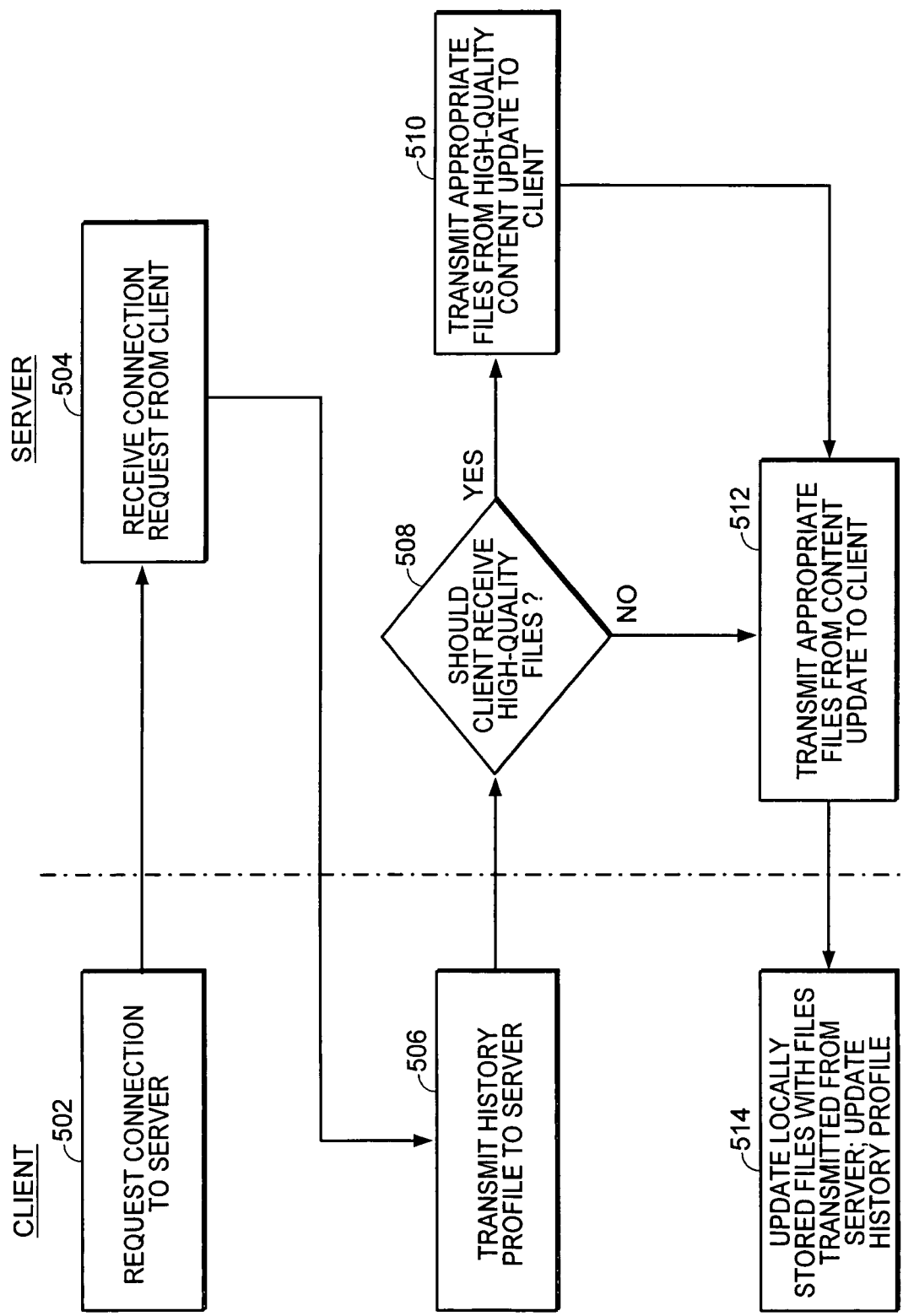
FIG. 5 is a flow chart which illustrates the transmission of content updates from a server to a client in accordance with one embodiment of the invention.

With respect to the high-quality update package creation step 408, in one embodiment, the high-quality files are removed from the content update package and placed in the high-quality content update package. In another embodiment, the high-quality data files are copied from the content update package to the high-quality content update package, so that copies of the high-quality data files remain in the original content update package FIG. 5 illustrates a process by which data files in a high-quality content update package may be transmitted to a client, in accordance with a preferred embodiment of the invention. Upon initialization of a program execution at the client, the client requests a network connection to the server in a connection request step 502. A networking protocol, such as TCP/IP, may be used to communicate between client and server. The server receives this request in a request reception step 504 and authenticates the client. The client then transmits to the server a history profile in a profile transmission step 506. Once the server receives the history profile, it determines if high-quality data files are to be sent to the client in a determination step 508. If high-quality data files are to be transmitted to the client, the server transmits the appropriate high-quality data files from the high-quality content update package in a high-quality transmission step 510. Other appropriate data files (i.e., not high-quality) are transmitted to the client in a transmission step 512. If high-quality data files are not to be transmitted to the client, then transmission step 512 takes place without the high-quality transmission step 510. After receiving the transmitted files from the content update package and/or high-quality content update package, the client updates its locally stored files in an updating step 514.

With respect to the profile transmission step 506, in one embodiment the history profile is a file stored on the client, comprising an iteration number representing the content update package most recently obtained by the client. In another embodiment, the history profile comprises a list of data files presently stored at the client along with version information for those data files. In another embodiment, the history profile is stored in a portable memory device, such as a "pen" drive that connects to a computer via a universal serial bus. In a preferred embodiment, the history profile further comprises an indicator of whether the client is to receive high-quality data files. Typically, this indicator may be a bit-value where, for example, high-quality data files are to be sent if the bit value is 1, and high-quality data files are not to be sent if the bit value is 0.

In a preferred embodiment, the determination step 508 is accomplished by reading a bit value from the received history profile, as described above. By comparing the client's history profile to the version information associated with the content update package, the server can determine appropriate files to be transmitted to the client. For example, appropriate files to transmit may include the most recent versions of those files for which the client is not up-to-date. Alternatively, or in addition, appropriate files to transmit may include new files for which no version is stored on the client. This determination of appropriate data files may take place for both the content update package and the high-quality content update package.

The updating step 514 may be performed by replacing older versions with the new versions transmitted by the server. Alternatively, the client may maintain older versions of the files in storage while indicating that the new versions transmitted by the server are to be used. The client also may update its history profile to reflect that it now locally stores the newer versions of the files.

The present invention can be provided as one or more computer-readable programs embodied on or in one or more articles of manufacture. The article of manufacture can be a floppy disk, a hard disk, a CD ROM, a flash memory card, a PROM, a RAM, a ROM, or a magnetic tape. In general, the computer-readable programs can be implemented in any programming language. Some examples of languages that can be used include C, C++, or JAVA. The software programs can be stored on or in one or more articles of manufacture as object code.

In this fashion, embodiments of the present invention separate high-quality content within a massively multiplayer game. It will be appreciated by those skilled in the art that various omissions, additions and modifications can be made to the methods and systems described above without departing from the scope of the invention, and all such modifications and changes are intended to fall within the scope of the invention, as defined by the appended claims.

The invention claimed is:

1. A method for efficiently transmitting, to a client, a content update for an on-line game, the method comprising the steps of:
   a) hosting in a non-volatile memory element, for transmission, a content update having a plurality of data files;
   b) identifying a subset of the plurality of data files as high-quality data files using a data quality function to identify a subset of the plurality of data files contained in the content update as high-quality data files;
   c) creating a high-quality content update that includes the identified high-quality data files;
   d) receiving a client connection request;
   e) determining that high-quality data files are to be transmitted to the client on the basis of information indicating high-quality files should be transferred, wherein the client is one of a plurality of clients comprising a player platform;
   f) transmitting the high-quality data files from the high-quality content update; and
   g) transmitting remaining non-high-quality data files in the content update;
   wherein the plurality of data files contained in the content update are sorted by data quality,
   wherein a certain fixed percentage of the highest quality data files are separated as high-quality data files;
   wherein the high-quality data files comprise data files having at least one of audio and graphics, and
   wherein a high-quality data file is larger than a corresponding non-high-quality data file.

2. The method of claim 1, wherein step a) comprises storing, on a network storage device, a content update having a plurality of data files.

3. The method of claim 1, further comprising the step of removing the high-quality data files from the content update.

4. The method of claim 1, wherein step e) comprises determining that the received request includes a bit value indicating high-quality files should be transferred.

5. A method for efficiently transmitting a content update for an on-line game from a server to a client, the method comprising:
   a) the server hosting, in a non-volatile memory element, a content update having a plurality of data files;
   b) identifying a subset of the plurality of data files from the content update as high-quality data files by identifying a subset of the plurality of data files as high-quality data files using a data quality function;
   c) creating, by the server, a high-quality content update that includes the identified high-quality data files;
   d) the client requesting a connection with the server;
   e) determining, by the server, that high-quality data files should be transmitted to the client on the basis of information indicating high-quality files should be transferred, wherein the client is one of a plurality of clients comprising a client platform;

f) the client receiving data files from the high-quality content update; and g) the client receiving remaining non-high-quality data files from the content update;

wherein the plurality of data files contained in the content update are sorted by data quality, and wherein a certain fixed percentage of the highest quality data files are separated as high-quality data files;

wherein the high-quality data files comprise data files having at least one of audio and graphics, and wherein a high-quality data file is larger than a corresponding non-high-quality data file.

6. The method of claim 5, wherein step a) comprises storing, on a network storage device, a content update comprising a plurality of data files.

7. The method of claim 5, further comprising the step of removing the high-quality data files from the content update.

8. The method of claim 5, wherein step e) comprises determining that the received request includes a bit value indicating high-quality files should be transferred.

9. A computer based content updating apparatus for updating content for an on-line game, said apparatus comprising:

a non-volatile memory element storing a content update for the on-line game, the content update having a plurality of data files;

a processor in electrical communication with the non-volatile memory element for identifying a subset of the data files in the content update as high-quality data files using a data quality function, separating the high-quality data files from the content update, and storing, in the non-volatile memory element, a high-quality content update that includes the separated high-quality data files; and a transceiver in electrical communication with the non-volatile memory element and the processor, the transceiver receiving a connection request from a remote client on a network, on the basis of information indicating high-quality files should be transferred, the client being one of a plurality of clients comprising a player platform;

wherein the processor determines that high-quality data files are to be transmitted to the client and the transceiver transmits data files from the high-quality content update and remaining non-high-quality data files from the content update wherein the plurality of data files contained in the content update are sorted by data quality, wherein a certain fixed percentage of the highest quality data files are separated as high-quality data files;

wherein the high-quality data file comprise data files containing at least one of audio and graphics, and wherein a high-quality data file is larger than a corresponding non-high-quality data file.

10. The apparatus of claim 9, wherein the processor removes the high-quality data files from the content update.

11. The apparatus of claim 9, wherein the connection request from a remote client received by the transceiver includes a bit value indicating high-quality files should be transferred.

12. The apparatus of claim 9, wherein the non-volatile memory element comprises a network storage device.

13. The apparatus of claim 9, wherein the non-volatile memory element is associated with a first computer, the processor is associated with a second computer, the transceiver is associated with a third computer, and the first computer, second computer, and third computer are in electrical connection with each other over a network.

* * * * *